(12) United States Patent
Abe et al.

(10) Patent No.: US 10,868,336 B2
(45) Date of Patent: Dec. 15, 2020

(54) NON-AQUEOUS ELECTROLYTIC SOLUTION FOR LITHIUM SECONDARY BATTERY OR LITHIUM ION CAPACITOR, AND LITHIUM SECONDARY BATTERY OR LITHIUM ION CAPACITOR USING THE SAME

(71) Applicant: UBE INDUSTRIES, LTD., Ube-shi (JP)

(72) Inventors: Koji Abe, Sakai (JP); Makoto Babazono, Ube (JP); Masahide Kondo, Sakai (JP); Hiroshi Yanagi, Sakai (JP); Kei Shimamoto, Sakai (JP)

(73) Assignee: UBE INDUSTRIES, LTD., Ube (JP)

( * ) Notice: Subject to any disclaimer, the term of this patent is extended or adjusted under 35 U.S.C. 154(b) by 54 days.

(21) Appl. No.: 15/765,068

(22) PCT Filed: Sep. 29, 2016

(86) PCT No.: PCT/JP2016/078843
§ 371 (c)(1),
(2) Date: Mar. 30, 2018

(87) PCT Pub. No.: WO2017/057588
PCT Pub. Date: Apr. 6, 2017

(65) Prior Publication Data
US 2018/0277900 A1 Sep. 27, 2018

(30) Foreign Application Priority Data

Oct. 1, 2015 (JP) .................................. 2015-195929
Dec. 22, 2015 (JP) .................................. 2015-249792

(51) Int. Cl.
| | | |
|---|---|---|
| *H01M 10/0569* | (2010.01) | |
| *H01G 11/60* | (2013.01) | |
| *H01M 10/052* | (2010.01) | |
| *H01G 11/06* | (2013.01) | |
| *H01G 11/62* | (2013.01) | |
| *H01M 4/36* | (2006.01) | |
| *H01M 4/505* | (2010.01) | |
| *H01M 4/525* | (2010.01) | |
| *H01M 10/0525* | (2010.01) | |
| *H01M 10/0568* | (2010.01) | |

(Continued)

(52) U.S. Cl.
CPC ........ *H01M 10/0569* (2013.01); *H01G 11/06* (2013.01); *H01G 11/60* (2013.01); *H01G 11/62* (2013.01); *H01M 4/364* (2013.01); *H01M 4/505* (2013.01); *H01M 4/525* (2013.01); *H01M 10/052* (2013.01); *H01M 10/0525* (2013.01); *H01G 11/32* (2013.01); *H01G 11/50* (2013.01); *H01M 4/386* (2013.01); *H01M 4/387* (2013.01); *H01M 4/485* (2013.01); *H01M 4/587* (2013.01); *H01M 4/5825* (2013.01); *H01M 10/0567* (2013.01); *H01M 10/0568* (2013.01); *H01M 2220/20* (2013.01); *H01M 2300/0034* (2013.01); *H01M 2300/0042* (2013.01); *Y02E 60/122* (2013.01); *Y02T 10/7011* (2013.01)

(58) Field of Classification Search
CPC ......... H01M 10/0569; H01M 10/0568; H01M 10/0567; H01M 10/0525; H01M 4/505; H01M 4/525; H01M 4/387; H01M 4/5825; H01M 4/485; H01M 4/386; H01M 4/587; H01M 2300/0042; H01M 2300/0034; H01M 2220/20; Y02E 60/122; Y02T 10/7011
See application file for complete search history.

(56) References Cited

U.S. PATENT DOCUMENTS

| | | |
|---|---|---|
| 5,256,504 A | 10/1993 | Okuno et al. |
| 5,474,862 A | 12/1995 | Okuno et al. |

(Continued)

FOREIGN PATENT DOCUMENTS

| | | |
|---|---|---|
| JP | 05-074488 A | 3/1993 |
| JP | 11-040195 A | 2/1999 |

(Continued)

OTHER PUBLICATIONS

International Search Report dated Dec. 27, 2016 in PCT/JP2016/078843, filed on Sep. 29, 2016.

(Continued)

*Primary Examiner* — Laura Weiner
(74) *Attorney, Agent, or Firm* — Oblon, McClelland, Maier & Neustadt, L.L.P.

(57) ABSTRACT

The present invention provides a non-aqueous electrolytic solution for a lithium secondary battery or a lithium ion capacitor, wherein the non-aqueous electrolytic solution includes a lithium salt as dissolved in a non-aqueous solvent in a concentration of 0.8 to 1.5 M (mol/L), the non-aqueous solvent includes, in relation to the whole of the non-aqueous solvent, 5 to 25% by volume of ethylene carbonate, 5 to 25% by volume of propylene carbonate, 20 to 30% by volume of dimethyl carbonate, 20 to 40% by volume of methyl ethyl carbonate, and 10 to 20% by volume of a fluorinated chain ester; the total content of ethylene carbonate and propylene carbonate in the non-aqueous solvent is 20 to 30% by volume, the total content of dimethyl carbonate and the fluorinated chain ester in the non-aqueous solvent is 30 to 40% by volume; and the flash point of the non-aqueous electrolytic solution is 20° C. or higher, and the present invention also provides an energy storage device.

7 Claims, No Drawings

(51) Int. Cl.
*H01M 10/0567* (2010.01)
*H01M 4/38* (2006.01)
*H01M 4/58* (2010.01)
*H01M 4/485* (2010.01)
*H01G 11/32* (2013.01)
*H01G 11/50* (2013.01)
*H01M 4/587* (2010.01)

(56) References Cited

U.S. PATENT DOCUMENTS

| | | |
|---|---|---|
| 6,503,662 B1 | 1/2003 | Hamamoto et al. |
| 2002/0009651 A1 | 1/2002 | Barker et al. |
| 2003/0077518 A1 | 4/2003 | Barker et al. |
| 2006/0124973 A1 | 6/2006 | Arai et al. |
| 2007/0148555 A1 | 6/2007 | Fukaya et al. |
| 2009/0253046 A1 | 10/2009 | Smart et al. |
| 2010/0081062 A1 | 4/2010 | Chiga et al. |
| 2012/0007560 A1 | 1/2012 | Smart et al. |
| 2012/0321940 A1 | 12/2012 | Kawasaki et al. |
| 2013/0089794 A1 | 4/2013 | Kim |
| 2013/0286542 A1 | 10/2013 | Madiberk et al. |
| 2013/0330635 A1 | 12/2013 | Shishikura et al. |
| 2014/0017572 A1 | 1/2014 | Uehara et al. |
| 2014/0205913 A1 | 7/2014 | Park et al. |
| 2014/0227584 A1 | 8/2014 | Holstein et al. |
| 2014/0248529 A1 | 9/2014 | Chen et al. |
| 2014/0302401 A1 | 10/2014 | Burkhardt et al. |
| 2014/0302402 A1 | 10/2014 | Chen et al. |
| 2015/0140444 A1 | 5/2015 | Dubois et al. |
| 2015/0221977 A1* | 8/2015 | Hallac .............. H01M 10/0525 429/163 |
| 2016/0149263 A1* | 5/2016 | Hallac .............. H01M 10/0568 429/163 |
| 2016/0197378 A1 | 7/2016 | Smart et al. |

FOREIGN PATENT DOCUMENTS

| | | |
|---|---|---|
| JP | 2002-530838 A | 9/2002 |
| JP | 2003-217659 A | 7/2003 |
| JP | 2005-259708 A | 9/2005 |
| JP | 2005-353579 A | 12/2005 |
| JP | 2006-172775 A | 6/2006 |
| JP | 2008-293812 A | 12/2008 |
| JP | 2009-289557 A | 12/2009 |
| JP | 2012-043628 A | 3/2012 |
| JP | 2012-238608 A | 12/2012 |
| JP | 2012-253032 A | 12/2012 |
| JP | 2013-084598 A | 5/2013 |
| JP | 2013-539606 A | 10/2013 |
| JP | 2014-170624 A | 9/2014 |
| WO | 2008/102493 A1 | 8/2008 |
| WO | 2011/118387 A1 | 9/2011 |
| WO | 2012/117852 A1 | 9/2012 |
| WO | 2012/132060 A1 | 10/2012 |
| WO | 2013/033579 A1 | 3/2013 |
| WO | 2014/165748 A1 | 10/2014 |

OTHER PUBLICATIONS

Hess et al, "Flammability of Li-Ion Battery Electrolytes: Flash Point and Self-Extinguishing Time Measurement", *Journal of the Electrochemical Society*, (2015) vol. 162 (2), pp. A3084-A3097.

* cited by examiner

NON-AQUEOUS ELECTROLYTIC SOLUTION FOR LITHIUM SECONDARY BATTERY OR LITHIUM ION CAPACITOR, AND LITHIUM SECONDARY BATTERY OR LITHIUM ION CAPACITOR USING THE SAME

TECHNICAL FIELD

The present invention relates to a non-aqueous electrolytic solution for a lithium secondary battery or a non-aqueous electrolytic solution for a lithium ion capacitor, the non-aqueous electrolytic solution being free from freezing even at a temperature as very low as −40° C., and being excellent in battery performances such as withstand voltage; and relates to a lithium secondary battery or a lithium ion capacitor using the same.

BACKGROUND ART

Recently, lithium secondary batteries or lithium ion capacitors have come to be widely used not only as the power sources for small electronic devices such as cellular phones and notebook personal computers, but also as vehicle-mounted power sources for electric vehicles or for stopping idling, and as power sources for power storage. For these electric vehicles, for the purpose of extending the cruising distance, energy storage devices have been undergoing the achievement of further higher voltages or the achievement of further higher energy densities. Consequently, the travel distances of electric vehicles have been extended, and electric vehicles are possibly going to be used in regions widely varied in temperature from very hot regions such as tropical regions to very cold regions. Therefore, these lithium secondary batteries or these lithium ion capacitors experience 60° C. or higher in vehicles under blazing sun. Alternatively, at a very low temperature as frigid as −40° C. or lower, the non-aqueous electrolytic solution possibly freezes. Accordingly, these lithium secondary batteries or these lithium ion capacitors are required to be capable of being used with the liquid state being maintained and exhibiting excellent battery performances even when used in "a wide temperature range extending over a temperature width of 100° C." from a high temperature of 60° C. to a very low temperature as low as −40° C. or lower.

A lithium secondary battery is mainly constituted with a positive electrode and a negative electrode, each mainly including a material capable of occluding and releasing lithium, and a non-aqueous electrolytic solution composed of a lithium salt and a non-aqueous solvent; as the non-aqueous solvent, carbonates such as ethylene carbonate (EC) and dimethyl carbonate (DMC) are used.

When such a non-aqueous electrolytic solution containing a non-aqueous solvent is used at a high voltage as high as 4.2 V or higher, sometimes the solvent is partially decomposed. It has been revealed that when a lithium secondary battery or a lithium ion capacitor is used in "a wide temperature range extending over a temperature width of 100° C." from a high temperature of 60° C. to a very low temperature as low as −40° C. or lower, physical properties such as flash point, freezing point, electric conductivity or viscosity significantly affects the battery characteristics; thus, the remediation of the above-described problems has been demanded.

Patent Document 1 discloses a non-aqueous electrolytic solution for a secondary battery in which the non-aqueous solvent is a mixed solvent composed of one or more cyclic esters and one or more chain esters, these esters are mutually compatible with each other, and at least one of the chain esters is a halogenated chain carbonate, and has shown that the safety is improved.

Patent Document 2 discloses a non-aqueous electrolytic solution for a secondary battery in which the non-aqueous solvent contains a fluorinated chain carboxylic acid ester and a coating film forming compound to be decomposed in a range from +1.0 to 3.0 V with reference to the equilibrium potential between metallic lithium and lithium ion, and has shown that the decrease of the battery capacity is suppressed under a high temperature condition.

In addition, Patent Document 3 discloses an electrolytic solution for a lithium ion battery in which a non-aqueous solvent contains 50 to 90% of 2,2-difluoroethyl acetate, and has shown that the cycle characteristics are improved under a high temperature condition at high voltage.

Further, Patent Document 4 discloses that in a lithium secondary battery using a non-aqueous electrolytic solution including a mixed solvent containing 20 to 35% by volume of ethylene carbonate, 35 to 45% by volume of ethyl methyl carbonate, 15 to 35% by volume of dimethyl carbonate and 3 to 15% by volume of diethyl carbonate or propylene carbonate, the cycle characteristics at room temperature and −30° C. are improved.

In addition, Patent Document 5 discloses that the output characteristics at −30° C. is improved in a lithium secondary battery using a non-aqueous electrolytic solution in which in a solvent prepared by mixing ethylene carbonate, dimethyl carbonate, ethyl methyl carbonate and methyl propionate in a volume ratio of 3:3:3:1, $LiPF_6$ is dissolved so as to have a concentration of 1 M, and 2% by mass of vinylene carbonate is added.

PRIOR ART DOCUMENTS

Patent Documents

Patent Document 1: Japanese Patent Publication No. 11-40195
Patent Document 2: WO 2008/102493
Patent Document 3: WO 2013/033579
Patent Document 4: Japanese Patent Publication No. 2005-353579
Patent Document 5: Japanese Patent Publication No. 2006-172775

SUMMARY OF THE INVENTION

Problem to be Solved by the Invention

An object of the present invention is to provide a non-aqueous electrolytic solution for a lithium secondary battery or a lithium ion capacitor, being free from freezing even at −40° C. or lower, being capable of being used with the liquid state being maintained and capable of exhibiting excellent battery performances in "a wide temperature range extending over a temperature width of 100° C.," and a lithium secondary battery and a lithium ion capacitor using the electrolytic solution.

Means for Solving the Problems

The present inventors studied in detail the performances of the above-described non-aqueous electrolytic solutions of the background art, and consequently have found that in the lithium secondary batteries using the non-aqueous electrolytic solutions of Patent Documents 1 to 5, the improvement of safety is achieved, and the cycle characteristics under high temperature conditions, under conditions of −30° C. or in a high voltage battery can be made satisfactory; however, for the problem that the non-aqueous electrolytic solution can be used without freezing with the liquid state being maintained even at −40° C. or lower, and exhibits excellent battery performances, no sufficient effects have been obtained, and as affairs now stand, no electrolytic solution composition free from freezing even at −40° C. or lower has never been disclosed.

Therefore, the present inventors made a diligent study in order to solve the above-described problems, and consequently have discovered that the flash point of the non-aqueous electrolytic solution is allowed to be 20° C. or higher and the electric conductivity of the non-aqueous electrolytic solution is allowed to be 8 mS/cm or more under the conditions that in a non-aqueous electrolytic solution including a lithium salt as dissolved in a non-aqueous solvent in a concentration of 0.8 to 1.5 M (mol/L), the non-aqueous solvent includes, in relation to the whole of the non-aqueous solvent, 5 to 25% by volume of ethylene carbonate, 5 to 25% by volume of propylene carbonate, 20 to 30% by volume of dimethyl carbonate, 10 to 20% by volume of a fluorinated chain ester, and 20 to 40% by volume of methyl ethyl carbonate, the total content of ethylene carbonate and propylene carbonate in the non-aqueous solvent is 20 to 30% by volume, and the total content of dimethyl carbonate and the fluorinated chain ester in the non-aqueous solvent is 30 to 40% by volume. The present inventors have perfected the present invention by discovering that furthermore, by using a mixed solvent containing various carbonates and the fluorinated chain ester in specific proportions, the resulting non-aqueous electrolytic solution does not freeze even at −40° C. or lower, is capable of being used with a liquid state being maintained in "a wide temperature range extending over a temperature width of 100° C.," exhibits excellent battery performances, and the withstand voltage is also improved. It is to be noted that such effects as described above are the effects that were absolutely not able to be achieved by the techniques of Patent Documents 1 to 5, and are the effects that have not absolutely been suggested in Patent Documents 1 to 5.

Besides, the present inventors made an additional diligent study in order to solve the above-described problems, and consequently have discovered that the flash point of the non-aqueous electrolytic solution is allowed to be 20° C. or higher and the electric conductivity of the non-aqueous electrolytic solution is allowed to be 8 mS/cm or more under the conditions that in a non-aqueous electrolytic solution including a lithium salt as dissolved in a non-aqueous solvent in a concentration of 0.9 to 1.5 M (mol/L), the non-aqueous solvent includes, in relation to the whole of the non-aqueous solvent, 5 to 25% by volume of ethylene carbonate, 5 to 25% by volume of propylene carbonate, 20 to 30% by volume of dimethyl carbonate, 20 to 40% by volume of methyl ethyl carbonate, and 10 to 20% by volume of ethyl propionate, and the total content of ethylene carbonate and propylene carbonate in the non-aqueous solvent is 20 to 30% by volume and the total content of dimethyl carbonate and ethyl propionate in the non-aqueous solvent is 30 to 40% by volume. The present inventors have perfected the present invention by further discovering that by using a mixed solvent including, in specific proportions, various carbonates and ethyl propionate having two ethyl groups at both terminals of the ester (—COO—), the resulting non-aqueous electrolytic solution does not freeze even at −40° C. or lower, is capable of being used with the liquid state being maintained in "a wide temperature range extending over a temperature width of 100° C.," exhibits excellent battery performances, and improves withstand voltage. It is to be noted that such effects have not absolutely been able to be achieved by the techniques disclosed in Patent Documents 1 to 5, and have not absolutely been suggested in Patent Documents 1 to 5.

Specifically, the present invention provides the following (1) to (4).

(1) A non-aqueous electrolytic solution for a lithium secondary battery or a lithium ion capacitor, wherein the non-aqueous electrolytic solution includes a lithium salt as dissolved in a non-aqueous solvent in a concentration of 0.8 to 1.5 M (mol/L), the non-aqueous solvent includes, in relation to the whole of the non-aqueous solvent, 5 to 25% by volume of ethylene carbonate, 5 to 25% by volume of propylene carbonate, 20 to 30% by volume of dimethyl carbonate, 10 to 20% by volume of a fluorinated chain ester, and 20 to 40% by volume of methyl ethyl carbonate, in the non-aqueous solvent, the total content of ethylene carbonate and propylene carbonate is 20 to 30% by volume, and the total content of dimethyl carbonate and the fluorinated chain ester is 30 to 40% by volume, and the flash point of the non-aqueous electrolytic solution is 20° C. or higher.

(2) A non-aqueous electrolytic solution for a lithium secondary battery or a lithium ion capacitor, wherein the non-aqueous electrolytic solution includes a lithium salt as dissolved in a non-aqueous solvent in a concentration of 0.9 to 1.5 M (mol/L), the non-aqueous solvent includes, in relation to the whole of the non-aqueous solvent, 5 to 25% by volume of ethylene carbonate, 5 to 25% by volume of propylene carbonate, 20 to 30% by volume of dimethyl carbonate, 20 to 40% by volume of methyl ethyl carbonate, and 10 to 20% by volume of ethyl propionate, in the non-aqueous solvent, the total content of ethylene carbonate and propylene carbonate is 20 to 30% by volume, and the total content of dimethyl carbonate and ethyl propionate is 30 to 40% by volume, and the flash point of the non-aqueous electrolytic solution is 20° C. or higher.

(3) A lithium secondary battery including a positive electrode, a negative electrode, and a non-aqueous electrolytic solution including an electrolyte salt as dissolved in a non-aqueous solvent, wherein the non-aqueous electrolytic solution is the non-aqueous electrolytic solution according to (1) or (2).

(4) A lithium ion capacitor including a positive electrode, a negative electrode, and a non-aqueous electrolytic solution including an electrolyte salt as dissolved in a non-aqueous solvent, wherein the non-aqueous electrolytic solution is the non-aqueous electrolytic solution according to (1) or (2).

Effect of the Invention

The non-aqueous electrolytic solution of the present invention sets the lithium salt concentration within a specific range, and includes specific solvents in specific proportions as mixed therein, hence is excellent in withstand voltage and has high flash point (20° C. or higher), has a low freezing point so as not to freeze at −40° C., and exhibits a high electric conductivity; therefore, according to the non-aqueous electrolytic solution of the present invention, it is possible to provide a lithium secondary battery or a lithium ion capacitor exhibiting excellent properties in a wide temperature range from a high temperature to a very low temperature.

DESCRIPTION OF EMBODIMENTS

The present invention relates to a non-aqueous electrolytic solution for a lithium secondary battery or a lithium ion capacitor, and a lithium secondary battery or a lithium ion capacitor using the same.

[Non-Aqueous Electrolytic Solution]

The non-aqueous electrolytic solution according to a first aspect of the present invention is a non-aqueous electrolytic solution for a lithium secondary battery or a lithium ion capacitor, including a lithium salt as dissolved in a non-aqueous solvent in a concentration of 0.8 to 1.5 M (mol/L), wherein the non-aqueous solvent includes, in relation to the whole of the non-aqueous solvent, 5 to 25% by volume of ethylene carbonate, 5 to 25% by volume of propylene carbonate, 20 to 30% by volume of dimethyl carbonate, 10 to 20% by volume of a fluorinated chain ester, and 20 to 40% by volume of methyl ethyl carbonate, in the non-aqueous solvent, the total content of ethylene carbonate and propylene carbonate is 20 to 30% by volume, and the total content of dimethyl carbonate and the fluorinated chain ester is 30 to 40% by volume, and the flash point of the non-aqueous electrolytic solution is 20° C. or higher.

Or alternatively, the non-aqueous electrolytic solution according to a second aspect of the present invention is a non-aqueous electrolytic solution for a lithium secondary battery or a lithium ion capacitor, including a lithium salt as dissolved in a non-aqueous solvent in a concentration of 0.9 to 1.5 m (mol/L), wherein the non-aqueous solvent includes, in relation to the whole of the non-aqueous solvent, 5 to 25% by volume of ethylene carbonate, 5 to 25% by volume of propylene carbonate, 20 to 30% by volume of dimethyl carbonate, 20 to 40% by volume of methyl ethyl carbonate, and 10 to 20% by volume of ethyl propionate, in the non-aqueous solvent, the total content of ethylene carbonate and propylene carbonate is 20 to 30% by volume, and the total content of dimethyl carbonate and ethyl propionate is 30 to 40% by volume, and the flash point of the non-aqueous electrolytic solution is 20° C. or higher.

[Lithium Salt]

As the lithium salts used in the non-aqueous electrolytic solution according to the first aspect of the present invention and the non-aqueous electrolytic solution according to the second aspect of the present invention, the following may be suitably mentioned.

Suitable examples of the lithium salt include: inorganic lithium salts such as $LiPF_6$, $LiPO_2F_2$, and $LiBF_4$; chain fluorinated alkyl group-containing lithium salts such as $LiN(SO_2F)_2$ [LiFSI], $LiN(SO_2CF_3)_2$, and $LiN(SO_2C_2F_5)_2$; S=O group-containing lithium salts such as lithium methyl sulfate [LMS], lithium ethyl sulfate [LES], or $FSO_3Li$; and oxalic acid skeleton-containing lithium salts such as lithium bis(oxalato) borate [LiBOB], lithium difluoro(oxalato)borate [LiDFOB], lithium tetrafluoro(oxalato)phosphate [LiTFOP], or lithium difluorobis(oxalato)phosphate [LiDFOP]; as the lithium salt, at least one selected from these can be used, or two or more selected from these can be used as mixtures.

Among these, $LiPF_6$, $LiPO_2F_2$, $LiN(SO_2F)_2$, lithium methyl sulfate, lithium ethyl sulfate, or lithium difluorobis(oxalato)phosphate is preferably used, and $LiPF_6$, $LiPO_2F_2$, $LiN(SO_2F)_2$, lithium methyl sulfate, or lithium ethyl sulfate is most preferably used. The concentration of the lithium salt in the non-aqueous electrolytic solution according to the first aspect is, in relation to the non-aqueous solvent, 0.8 M (mol/L) or more, preferably 1.0 M or more, and more preferably 1.1 M or more. The upper limit of the concentration of the lithium salt is 1.5 M or less, preferably 1.45 M or less, and more preferably 1.4 M or less. The concentration of the lithium salt in the non-aqueous electrolytic solution according to the second aspect is, in relation to the non-aqueous solvent, 0.9 M (mol/L) or more, preferably 1.0 M or more, more preferably 1.1 M or more, further preferably 1.15 M or more, and particularly preferably 1.2 M or more. The upper limit of the concentration of the lithium salt is 1.5 M or less, preferably 1.45 M or less, and more preferably 1.4 M or less.

As these electrolyte salts, lithium salts containing at least $LiPF_6$ are preferable; lithium salts containing at least $LiPF_6$ and $LiN(SO_2F)_2$ are more preferable, and lithium salts containing, in addition to $LiPF_6$ and $LiN(SO_2F)_2$, a lithium salt(s) other than these are further preferable. When the concentration of the lithium salt other than $LiPF_6$ and/or $LiN(SO_2F)_2$, such as $LiPO_2F_2$, in the non-aqueous solvent in "a wide temperature range extending over a temperature width of 100° C." is 0.001 M or more, the battery characteristics in the wide temperature range are improved, and when the concentration of the lithium salt concerned is 0.3 M or less, the concern about the degradation of the effect of improving the battery characteristics in the wide temperature range is preferably small. The concentration of the lithium salt concerned is preferably 0.01 M or more, particularly preferably 0.03 M or more, and most preferably 0.04 M or more. The upper limit of the concentration of the lithium salt concerned is preferably 0.3 M or less, further preferably 0.25 M or less, and particularly preferably 0.2 M or less.

The concentration of the oxalic acid skeleton-containing lithium salt and the S=O group-containing lithium salt in the non-aqueous solvent is preferably 0.001 M or more and 0.5 M or less. When the concentration concerned falls within this range, the effect of improving the electrochemical characteristics in a wide temperature range is markedly displayed. The concentration concerned is preferably 0.01 M or more, further preferably 0.03 M or more, and particularly preferably 0.04 M or more. The upper limit of the concentration concerned is further preferably 0.4 M or less, and particularly preferably 0.2 M or less.

[Non-Aqueous Solvent]

As the non-aqueous solvent used in the non-aqueous electrolytic solution according to the first aspect of the present invention and the non-aqueous electrolytic solution according to the second aspect of the present invention, a mixed solvent containing acyclic carbonate, a chain carbonate, and a chain ester is used, from the viewpoint that the electrochemical characteristics are synergistically improved over a wide temperature range.

As the cyclic carbonate, at least, ethylene carbonate and propylene carbonate are used.

The content of ethylene carbonate is 5% by volume or more, preferably 7% by volume or more, and more preferably 9% by volume or more, in relation to the whole of the non-aqueous solvent, from the viewpoint of the improvement of the electric conductivity. The upper limit of the content of ethylene carbonate is 25% by volume or less, preferably 22% by volume or less, more preferably 20% by volume or less, further preferably 17% by volume or less, and particularly preferably 15% by volume or less, in relation to the whole of the non-aqueous solvent, from the viewpoint of lowering the freezing point.

The content of propylene carbonate is 5% by volume or more, preferably 7% by volume or more, and more preferably 9% by volume or more, in relation to the whole of the non-aqueous solvent, from the viewpoint of the improvement of the electrochemical characteristics in a high temperature environment. The upper limit of the content of propylene carbonate is 25% by volume or less, preferably 20% by volume or less, more preferably 17% by volume or less, and further preferably 15% by volume or less, in relation to the whole of the non-aqueous solvent, from the viewpoint of the improvement of the electric conductivity.

Further, the total content of ethylene carbonate and propylene carbonate is 20% by volume or more, and preferably 22% by volume or more, in relation to the whole of the non-aqueous solvent, from the viewpoint of the improvement of the electric conductivity. The upper limit of the total content of ethylene carbonate and propylene carbonate is 30% by volume or less, and preferably 27% by volume or less, in relation to the whole of the non-aqueous solvent, from the viewpoint of the improvement of the electrochemical characteristics in a high temperature environment.

In the non-aqueous solvent used in the non-aqueous electrolytic solution according to the first aspect of the present invention and the non-aqueous electrolytic solution according to the second aspect of the present invention, other cyclic carbonates other than ethylene carbonate and propylene carbonate may be included. As the examples of the "other cyclic carbonates," one or two or more selected from the group consisting of the following may be suitably mentioned: cyclic carbonates having an alkyl group and being 5 or more in the whole number of carbon atoms such as 1,2-butylene carbonate or 2,3-butylene carbonate; fluorine atom-containing cyclic carbonates such as 4-fluoro-1,3-dioxolan-2-one (FEC) or trans or cis-4,5-difluoro-1,3-dioxolan-2-one (hereinafter, both are collectively referred to as "DFEC"); cyclic carbonates having a carbon-carbon double bond such as vinylene carbonate (VC) or vinylethylene carbonate (VEC); and cyclic carbonates having a carbon-carbon triple bond such as 2-propynyl 2-oxo-1,3-dioxolane-4-carboxylate (PDC) or 4-ethynyl-1,3-dioxolan-2-one (EEC).

As the "other cyclic carbonates," one or two or more selected from 4-fluoro-1,3-dioxolan-2-one, vinylene carbonate, 2-propynyl 2-oxo-1,3-dioxolane-4-carboxylate, and 4-ethynyl-1,3-dioxolan-2-one are more suitable.

In addition, as the "other cyclic carbonates," the use of at least one of the cyclic carbonates having an unsaturated bond such as a carbon-carbon double bond or a carbon-carbon triple bond or a fluorine atom(s) is preferable because the electrochemical characteristics in a high temperature environment is markedly improved, and the inclusion of both of a cyclic carbonate having an unsaturated bond such as a carbon-carbon double bond or a carbon-carbon triple bond and a cyclic carbonate having a fluorine atom(s) is more preferable.

The electrochemical characteristics in a markedly wide temperature range can be preferably enhanced without degrading the Li ion permeability when the content of the cyclic carbonate having an unsaturated bond such as a carbon-carbon double bond or a carbon-carbon triple bond, in relation to the whole of the non-aqueous solvent, is preferably 0.07% by volume or more, more preferably 0.2% by volume or more, and further preferably 0.7% by volume or more, and the upper limit of the content concerned is preferably 7% by volume or less, more preferably 4% by volume or less, and further preferably 2.5% by volume or less.

The electrochemical characteristics in a markedly wide temperature range can be preferably enhanced without degrading the Li ion permeability when the content of the cyclic carbonate having a fluorine atom(s), in relation to the whole of the non-aqueous solvent, is preferably 0.07% by volume or more, more preferably 0.3% by volume or more, and further preferably 0.7% by volume or more, and the upper limit of the content concerned is preferably 10% by volume or less, more preferably 7% by volume or less, and further preferably 5% by volume or less.

In the case where a cyclic carbonate having an unsaturated bond such as a carbon-carbon double bond or a carbon-carbon triple bond and a cyclic carbonate having a fluorine atom(s) are used in combination, the total content of these carbonates is preferably 0.3% by volume or more and more preferably 0.7% by volume or more, in relation to the whole of the non-aqueous solvent. The upper limit of the total content of these carbonates us preferably 7% by volume or less and more preferably 5% by volume or less. The above-described content range more preferably leads to the synergistic effect due to the combined use of the cyclic carbonate having an unsaturated bond and the fluorine atom-containing cyclic carbonate.

When these cyclic carbonates are used in combination of three or more thereof, the improvement effect of the electrochemical characteristics in a high temperature environment is preferably further improved, and the use of these cyclic carbonates in combination of four or more thereof is particularly preferable. As suitable combinations of these cyclic carbonates, for example, the following are preferable: EC, PC and VC; EC, PC and FEC; EC, PC and VEC; EC, PC and EEC; EC, PC, VC and FEC; EC, PC, VC and VEC; EC, PC, VC and EEC; EC, PC, FEC and VEC; EC, PC, FEC and EEC; or EC, PC, VEC and EEC. More preferable among the above-described combinations are, for example, EC, PC and VC; EC, PC and FEC; EC, PC and EEC; EC, PC, VC and FEC, or EC, PC, VC and EEC.

In the non-aqueous electrolytic solution according to the first aspect of the present invention and the non-aqueous electrolytic solution according to the second aspect of the present invention, at least, methyl ethyl carbonate and dimethyl carbonate are used as the chain carbonate.

The content of methyl ethyl carbonate is 20% by volume or more, preferably 23% by volume or more, more preferably 30% by volume or more, and particularly preferably 33% by volume or more, in relation to the whole of the non-aqueous solvent, from the viewpoint of the improvement of the electrochemical characteristics in a high temperature environment. The upper limit of the content of methyl ethyl carbonate is 40% by volume or less, and preferably 37% by volume or less, in relation to the whole of the non-aqueous solvent, from the viewpoint of the improvement of the electric conductivity.

The content of dimethyl carbonate is 20% by volume or more, and preferably 23% by volume or more, in relation to the whole of the non-aqueous solvent, from the viewpoint of the improvement of the electric conductivity. The upper limit of the content of dimethyl carbonate is 30% by volume or less, and preferably 27% by volume or less, in relation to the whole of the non-aqueous solvent, from the viewpoint of the improvement of the electrochemical characteristics in a high temperature environment.

Besides, in the non-aqueous solvent used in the non-aqueous electrolytic solution according to the first aspect of the present invention and the non-aqueous electrolytic solution according to the second aspect of the present invention, other chain carbonates other than methyl ethyl carbonate and dimethyl carbonate may be included. As the examples of the other chain carbonates, the following may be suitably mentioned: one or two or more asymmetric chain carbonates selected from methyl propyl carbonate (MPC), methyl isopropyl carbonate (MIPC), methyl butyl carbonate, and ethyl propyl carbonate; and one or two or more symmetric chain carbonates selected from diethyl carbonate (DEC), dipropyl carbonate, and dibutyl carbonate.

The non-aqueous electrolytic solution according to the first aspect of the present invention includes a fluorinated chain ester as a chain ester. As the fluorinated chain ester used in the present invention, a chain ester in which an arbitrary carbon atom(s) is substituted with a fluorine atom (s) may be mentioned. In particular, a compound in which the carbon atom(s) in the alkyloxy group moiety of a chain ester is substituted with a fluorine atom(s) may be suitably mentioned.

As the fluorinated chain ester, in particular, the compound represented by the following general formula (I) may be suitably mentioned.

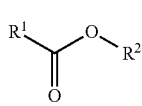

(I)

(In the formula, $R^1$ is $CF_mH_{3-m}$ or $OCF_mH_{3-m}$, $R^2$ is $CH_3$, $C_2H_5$, or $CH_2CF_nH_{3-n}$, m is an integer from 0 to 3, and n represents 2 or 3, with the proviso that either of $R^1$ and $R^2$ is substituted with at least one fluorine atom.)

Suitable specific examples of the fluorinated chain ester represented by the general formula (I) include: one or more selected from the group consisting of 2,2-difluoroethyl acetate (DFEA), 2,2,2-trifluoroethyl acetate (TFEA), 2,2-difluoroethyl methyl carbonate (DFEMC), 2,2,2-trifluoroethyl methyl carbonate (TFEMC), methyl trifluoroacetate, ethyl trifluoroacetate, 2,2-difluoroethyl trifluoroacetate, and 2,2,2-trifluoroethyl trifluoroacetate.

Among these, from the viewpoint of the improvement of the electrochemical characteristics in a high temperature environment, 2,2,2-trifluoroethyl methyl carbonate, 2,2-difluoroethyl methyl carbonate, 2,2,2-trifluoroethyl acetate, or 2,2-difluoroethyl acetate is more preferable.

In the first aspect of the present invention, the content of the fluorinated chain ester is 10% by volume or more, and preferably 12% by volume or more, in relation to the whole of the non-aqueous solvent, from the viewpoint of the improvement of the withstand voltage and the improvement of the electrochemical characteristics in a high temperature environment. The upper limit of the content of the fluorinated chain ester is 20% by volume or less, and preferably 18% by volume or less, from the viewpoint of improvement of the electric conductivity.

In the non-aqueous solvent used in the non-aqueous electrolytic solution according to the first aspect of the present invention, other chain esters other than the fluorinated chain ester may be included. Suitable examples of the other chain ester include one or two or more chain carboxylic acid esters selected from methyl pivalate (MPv), ethyl pivalate, propyl pivalate, methyl propionate (MP), propyl propionate, methyl acetate, and ethyl acetate. Among these, the inclusion of one or more selected from methyl pivalate (MPv), ethyl pivalate, and propyl pivalate, namely the chain esters in each of which all the hydrogen atoms of the α-position carbon atom of the ester are substituted with methyl groups, allows the low temperature characteristics after storage at a high temperature to be further satisfactory.

In the non-aqueous electrolytic solution according to the first aspect of the present invention, the total content of dimethyl carbonate and the fluorinated chain ester is 30% by volume or more, and preferably 32% by volume or more, in relation to the whole of the non-aqueous solvent, from the viewpoint of the improvement of the electric conductivity. The upper limit of the total content of dimethyl carbonate and the fluorinated chain ester is 40% by volume or less, and preferably 37% by volume or less, in relation to the whole of the non-aqueous solvent, from the viewpoint of the improvement of the electrochemical characteristics in a high temperature environment.

In the non-aqueous electrolytic solution according to the first aspect of the present invention, the total content of the chain carbonate and the fluorinated chain ester is not particularly limited, but the chain carbonate and the fluorinated chain ester are preferably used in a total content range from 70 to 80% by volume in relation to the whole of the non-aqueous solvent. The above-described range is preferable because when the content concerned is 70% by volume or more, the viscosity of the non-aqueous electrolytic solution is not too high, and when the content concerned is 80% by volume or less, the electrochemical characteristics in a wide temperature range due to the decrease of the electric conductivity of the non-aqueous electrolytic solution is less likely to worsen.

Alternatively, the non-aqueous electrolytic solution according to the second aspect of the present invention includes ethyl propionate as the chain ester.

In the non-aqueous electrolytic solution according to the second aspect of the present invention, the content of ethyl propionate is 10% by volume or more, and preferably 12% by volume or more, in relation to the whole of the non-aqueous solvent, from the viewpoint of the improvement of the electric conductivity. The upper limit of the content of ethyl propionate is 20% by volume or less, and preferably 18% by volume or less, from the viewpoint of the improvement of the electrochemical characteristics in a high temperature environment.

In the non-aqueous solvent used in the non-aqueous electrolytic solution according to the second aspect of the present invention, other chain esters other than ethyl propionate may be included. Suitable examples of the other chain esters include one or two or more chain carboxylic acid esters selected from methyl pivalate (MPv), ethyl pivalate, propyl pivalate, methyl propionate (MP), propyl propionate, methyl acetate, and ethyl acetate. Among these, the inclusion of one or more selected from methyl pivalate (MPv), ethyl pivalate, and propyl pivalate, namely the chain esters in each of which all the hydrogen atoms of the α-position carbon atom of the ester are substituted with methyl groups, allows the low temperature characteristics after storage at a high temperature to be further satisfactory.

In the non-aqueous electrolytic solution according to the second aspect of the present invention, the total content of dimethyl carbonate and ethyl propionate is 30% by volume or more, and preferably 32% by volume or more, in relation to the whole of the non-aqueous solvent, from the viewpoint of the improvement of the electric conductivity. The upper limit of the total content of dimethyl carbonate and ethyl propionate is 40% by volume or less, and preferably 37% by volume or less, in relation to the whole of the non-aqueous solvent, from the viewpoint of the improvement of the electrochemical characteristics in a high temperature environment.

In the non-aqueous electrolytic solution according to the second aspect of the present invention, the total content of the chain carbonate and ethyl propionate is not particularly limited, but the chain carbonate and ethyl propionate are preferably used in a total content range from 70 to 80% by volume in relation to the whole of the non-aqueous solvent. The above-described range is preferable because when the content concerned is 70% by volume or more, the viscosity of the non-aqueous electrolytic solution is not too high, and when the content concerned is 80% by volume or less, the electrochemical characteristics in a wide temperature range due to the decrease of the electric conductivity of the non-aqueous electrolytic solution is less likely to worsen.

In the non-aqueous electrolytic solution according to the first aspect of the present invention and the non-aqueous electrolytic solution according to the second aspect of the present invention, the volume proportion of the asymmetric chain carbonate in the chain carbonate is preferably 50% by volume or more and more preferably 52% by volume or more. The upper limit of the volume proportion concerned is more preferably 80% by volume or less and further preferably 78% by volume or less. The above-described case is preferable because the electrochemical characteristics in a wide temperature range is markedly improved.

In the non-aqueous electrolytic solution according to the first aspect of the present invention and the non-aqueous electrolytic solution according to the second aspect of the present invention, the ratio among the cyclic carbonate, the chain carbonate and the chain ester is preferably such that the ratio of cyclic carbonate:chain carbonate:chain ester (volume ratio) is (20 to 30):(50 to 60):(10 to 20), from the viewpoint of the improvement of the electrochemical characteristics in a high temperature environment. The above-described case is preferable because the electrochemical characteristics in a wide temperature range is markedly improved.

In the non-aqueous electrolytic solution according to the first aspect of the present invention and the non-aqueous electrolytic solution according to the second aspect of the present invention, other non-aqueous solvents other than the cyclic carbonate, the chain carbonate, and the chain ester may be included. As the examples of the other non-aqueous solvents, one or two or more selected from the following may be suitably mentioned: cyclic ethers such as tetrahydrofuran, 2-methyl tetrahydrofuran, and 1,4-dioxane; chain ethers such as 1,2-dimethoxyethane, 1,2-diethoxyethane, and 1,2-dibutoxyethane; amides such as dimethylformamide; sulfones such as sulfolane; and lactones such as γ-butyrolactone (GBL), γ-valerolactone, and α-angelica lactone.

The content of the other non-aqueous solvent is, in relation to the whole of the non-aqueous solvent, usually 1% by volume or more, and preferably 2% by volume or more, and usually 20% by volume or less, preferably 10% by volume or less, and further preferably 5% by volume or less.

For the purpose of improving the electrochemical characteristics in a markedly wide temperature range, it is preferable to add other additives in the non-aqueous electrolytic solution according to the first aspect of the present invention and the non-aqueous electrolytic solution according to the second aspect of the present invention.

Suitable specific examples of the other additives include the following (A) S=O group-containing compounds or (B) lithium salt compounds.

(A) One or two or more S=O group-containing compounds selected from the following compounds may be mentioned: sultones such as 1,3-propanesultone, 1,3-butanesultone, 2,4-butanesultone, 1,4-butanesultone, 1,3-propenesultone, 2,2-dioxide-1,2-oxathiolan-4-yl acetate, or 5,5-dimethyl-1,2-oxathiolan-4-one 2,2-dioxide; cyclic sulfites such as ethylene sulfite, hexahydrobenzo[1,3,2]dioxathiolane-2-oxide (also referred to as 1,2-cyclohexanediol cyclic sulfite), or 5-vinyl-hexahydro-1,3,2-benzodioxathiol-2-oxide; cyclic sulfates such as ethylene sulfate, tetrahydro-4H-cyclopenta[d][1,3,2]dioxathiol-2,2-dioxide, [4,4'-bi(1,3,2-dioxathiolane)]2,2,2',2'-tetraoxide, (2,2-dioxide-1,3,2-dioxathiolan-4-yl)methyl methanesulfonate, or 4-((methylsulfonyl)methyl)-1,3,2-dioxathiolane 2,2-dioxide; sulfonic acid esters such as butane-2,3-diyl dimethanesulfonate, butane-1,4-diyl dimethanesulfonate, or methylene methanedisulfonate; and vinylsulfone compounds such as divinyl sulfone, 1,2-bis(vinylsulfonyl)ethane, or bis(2-vinylsulfonylethyl) ether.

Among the cyclic or chain S=O group-containing compounds selected from the group consisting of these sultones, cyclic sulfites, cyclic sulfates, sulfonic acid esters and vinyl sulfones, one or two or more selected from the group consisting of the following are preferable: 1,3-propanesultone, 1,4-butanesultone, 2,4-butanesultone, 2,2-dioxide-1,2-oxathiolan-4-yl acetate, 5,5-dimethyl-1,2-oxathiolan-4-one 2,2-dioxide, ethylene sulfate, tetrahydro-4H-cyclopenta[d][1,3,2]dioxathiol-2,2-dioxide, [4,4'-bi(1,3,2-dioxathiolane)]2,2,2',2'-tetraoxide, (2,2-dioxide-1,3,2-dioxathiolan-4-yl)methyl methanesulfonate, butane-2,3-diyl dimethanesulfonate, pentafluorophenyl methanesulfonate and divinyl sulfone. Moreover, one or two or more selected from the following are more preferable: 1,3-propanesultone, 2,2-dioxide-1,2-oxathiolan-4-yl acetate, ethylene sulfate, tetrahydro-4H-cyclopenta[d][1,3,2]dioxathiol-2,2-dioxide, [4,4'-bi(1,3,2-dioxathiolane)]2,2,2',2'-tetraoxide, (2,2-dioxide-1,3,2-dioxathiolan-4-yl)methyl methanesulfonate, and pentafluorophenyl methanesulfonate; and one or two or more cyclic sulfates selected from the following are further preferable: ethylene sulfate, tetrahydro-4H-cyclopenta[d][1,3,2]dioxathiol-2,2-dioxide, and [4,4'-bi(1,3,2-dioxathiolane)]2,2,2',2'-tetraoxide.

The content of the S=O group-containing compound in the non-aqueous electrolytic solution is preferably 0.001 to 5% by mass. This range allows a coating film to be sufficiently formed without becoming too thick, and allows the electrochemical characteristics to be enhanced in a markedly wide temperature range. The content concerned in the non-aqueous electrolytic solution is more preferably 0.01% by mass or more, and further preferably 0.1% by mass or more, and the upper limit of the content concerned is more preferably 3% by mass or less, and further preferably 2% by mass or less.

(B) The lithium salt compounds represented by the following general formula (II) or (III) are quoted; each of which are composed of lithium cations having one or more ether compounds selected from 2,5,8,11-tetraoxadodecane (hereinafter, also referred to as "TOD") and 2,5,8,11,14-pentaoxapentadecane (hereinafter, also referred to as "POP") as ligands and a difluorophosphate anion

  (II)

  (III)

From the viewpoint of the improvement of the electrochemical characteristics in a wide temperature range, more preferable among these is bis(difluorophosphoryl) (2,5,8,11-tetraoxadodecane) dilithium (TOD complex) represented by the above-described general formula (II).

The content of the lithium salt compound represented by the above-described general formula (II) or (III) in the non-aqueous electrolytic solution is preferably 0.01 to 5% by mass. This range allows a coating film to be sufficiently formed without becoming too thick, and allows the electrochemical characteristics to be enhanced in a markedly wide temperature range. The content concerned in the non-aqueous electrolytic solution is more preferably 0.05% by mass or more, and further preferably 0.1% by mass or more, and the upper limit of the content concerned is more preferably 4% by mass or less, and further preferably 3% by mass or less.

[Production of Non-Aqueous Electrolytic Solution]

The non-aqueous electrolytic solution according to the first aspect of the present invention and the non-aqueous electrolytic solution according to the second aspect of the present invention can each be obtained, for example, by mixing the above-described non-aqueous solvents, and by dissolving the above-described lithium salt in the resulting mixed non-aqueous solvent, and by adding other additives in the resulting non-aqueous electrolytic solution.

In this case, it is preferable that the non-aqueous solvent to be used and the additives to be added to the non-aqueous electrolytic solution are preliminarily purified to the extent that the productivity does not decrease, and the non-aqueous solvents and the additives extremely small in the amounts of impurities are used.

The non-aqueous electrolytic solution according to the first aspect of the present invention and the non-aqueous electrolytic solution according to the second aspect of the present invention can be used in the following lithium secondary battery or the following lithium ion capacitor, and can use as the non-aqueous electrolyte not only liquid non-aqueous electrolytes but also gelled non-aqueous electrolytes. Moreover, the non-aqueous electrolytic solution according to the first aspect of the present invention and the non-aqueous electrolytic solution according to the second aspect of the present invention can also be used for solid polymer electrolytes. In particular, these non-aqueous electrolytic solutions are more preferably used for lithium secondary batteries.

The non-aqueous electrolytic solution according to the first aspect of the present invention and the non-aqueous electrolytic solution according to the second aspect of the present invention include the above-described components in the above-described proportions, accordingly each have a flash point of 20° C. or higher, and preferably 20.5° C. or higher, and thus are excellent in stability in a high temperature environment.

Moreover, the non-aqueous electrolytic solution according to the first aspect of the present invention and the non-aqueous electrolytic solution according to the second aspect of the present invention include the above-described components in the above-described proportions, accordingly each have a freezing point of preferably −45° C. or lower, more preferably −48° C. or lower, further preferably −50° C. or lower, and are excellent in the electric characteristics in a low temperature environment.

In addition, the non-aqueous electrolytic solution according to the first aspect of the present invention and the non-aqueous electrolytic solution according to the second aspect of the present invention each include the above-described components in the above-described proportions, accordingly each have an electric conductivity at 25° C. of preferably 8 mS/cm or more, more preferably 8.1 mS/cm or more, further preferably 8.3 mS/cm or more, furthermore preferably 9 mS/cm or more, particularly preferably 9.1 mS/cm or more, and most preferably 9.3 mS/cm or more, and are also excellent in electric conductivity.

Therefore, the non-aqueous electrolytic solution according to the first aspect of the present invention and the non-aqueous electrolytic solution according to the second aspect of the present invention are each suitably used as a non-aqueous electrolytic solution of a lithium secondary battery or a lithium ion capacitor, in particular, as a non-aqueous electrolytic solution for a lithium secondary battery or a lithium ion capacitor used in a wide temperature range.

[Lithium Secondary Battery]

In the present description, the term of lithium secondary battery is used as a concept including a so-called lithium ion secondary battery.

The lithium secondary battery of the present invention includes a positive electrode, a negative electrode, the non-aqueous electrolytic solution according to the first aspect of the present invention including a lithium salt as dissolved in a non-aqueous solvent and the non-aqueous electrolytic solution according to the second aspect of the present invention including a lithium salt as dissolved in a non-aqueous solvent. The constituent members such as a positive electrode and a negative electrode other than the non-aqueous electrolytic solution can be used without being particularly limited.

For example, as the positive electrode active material for a lithium secondary battery, there is used a composite metal oxide with lithium containing one or two or more selected from the group consisting of cobalt, manganese and nickel, or a lithium-containing olivine-type phosphate containing one or two or more selected from iron, cobalt, nickel and manganese. These positive electrode active materials can be used each alone or in combinations of two or more thereof.

Suitable examples of such a lithium composite metal oxide include one or more selected from $LiCoO_2$, $LiMn_2O_4$, $LiNiO_2$, $LiCo_{1-x}Ni_xO_2$ (0.01<x<1), $LiNi_xMn_yCo_zO_2$ (x+y+z=1), a solid solution of $Li_2MnO_3$ and $LiMO_2$ (M is a transition metal such as Co, Ni, Mn, or Fe), $LiNi_{1/2}Mn_{3/2}O_4$, $LiFePO_4$, $LiMnPO_4$, and $LiMn_{1-x}Fe_xPO_4$ (0.01<x<1); two or more selected from these are more preferable. These composite metal oxides with lithium or these lithium-containing olivine-type phosphates may be partially substituted with other elements; a fraction of cobalt, nickel, manganese, or iron can be substituted with one or two or more elements selected from Co, Mn, Ni, Mg, Al, B, Ti, V, Nb, Cu, Zn, Mo, Ca, Sr, W, and Zr, or can be coated with compounds containing these other elements or carbon material.

When a lithium composite metal oxide operating at a high charging voltage is used, the electrochemical characteristics tend to be degraded in a high temperature environment due to the reaction with the electrolytic solution during charging; however, the lithium secondary battery according to the present invention can suppress the degradation of these electrochemical characteristics.

From the viewpoint of the achievement of a high voltage, the voltage during charging is such that the positive electrode potential is preferably 4.3 V (vs. Li/Li$^+$) or higher, more preferably 4.35 V (vs. Li/Li$^+$) or higher, and particularly preferably 4.4 V (vs. Li/Li$^+$) or higher.

Further, in the case of a positive electrode active material containing Ni, the decomposition of the non-aqueous solvent is caused due to the catalytic action of Ni on the positive electrode surface, and accordingly the resistance of the battery tends to be increased. In particular, the electrochemical characteristics in a high temperature environment tend to be degraded; however, the lithium secondary battery according to the present invention preferably can suppress the degradation of these electrochemical characteristics. In particular, the above-described effect is preferably remarkable in the case where a positive electrode active material is used in which the atomic concentration proportion of Ni in relation to the atomic concentrations of all the transition metal elements in the positive electrode active material exceeds 10 atomic %, the atomic concentration proportion of Ni being further preferably 20 atomic % or more, and particularly preferably 30 atomic % or more. Suitable specific examples of such a positive electrode active material include $LiCo_{1/3}Ni_{1/3}Mn_{1/3}O_2$, $LiNi_{0.5}Mn_{0.3}Co_{0.2}O_2$, $LiNi_{0.8}Mn_{0.1}Co_{0.1}O_2$, and $LiNi_{0.8}Co_{0.15}Al_{0.05}O_2$.

Besides, as the positive electrode for a lithium primary battery, for example, metal oxides such as $MnO_2$, sulfur compounds such as $SOCl_2$, and a fluorinated carbon (fluorinated graphite) represented by a general formula $(CF_x)_n$ may be mentioned. Among these, for example, $MnO_2$ and the fluorinated graphite are preferable.

The conducting agent of the positive electrode is not particularly limited as long as the conducting agent is an electron conductive material not causing chemical change. Examples of the conducting agent of the positive electrode include: graphites such as natural graphite (such as flake graphite) and artificial graphite; and carbon blacks such as acetylene black, Ketjen black, channel black, furnace black, lamp black, or thermal black. In addition, graphites and carbon blacks may be used as an appropriate mixture thereof. The addition amount to the positive electrode mixture is preferably 1 to 10% by mass and particularly preferably 2 to 5% by mass.

A positive electrode can be prepared as follows: the positive electrode active material is mixed with a conducting agent such as acetylene black or carbon black and a binder such as polytetrafluoroethylene (PTFE), polyvinylidene fluoride (PVDF), styrene-butadiene copolymer (SBR), or carboxymethyl cellulose (CMC), a high boiling point solvent such as 1-methyl-2-pyrrolidone is added to the resulting mixture, the resulting mixture is kneaded to prepare a positive electrode mixture slurry, and then the prepared slurry is applied on a current collector such as an aluminum foil, dried and pressurized to form a positive electrode mixture layer.

The density of the positive electrode exclusive of the current collector is usually 1.5 g/cm$^3$ or more, and for the purpose of further enhancing the capacity of the battery, the density concerned is preferably 2 g/cm$^3$ or more, more preferably, 3 g/cm$^3$ or more, and further preferably, 3.6 g/cm$^3$ or more. It is to be noted that the upper limit of the density concerned is preferably 4 g/cm$^3$ or less.

As a negative electrode active material for the lithium secondary battery, the following can be used each alone or in combinations of two or more thereof: lithium metal and lithium alloy, and carbon materials capable of occluding and releasing lithium [such as easily graphitizable carbon, hardly graphitizable carbon having a (002) plane spacing of 0.37 nm or more, a graphite having a (002) plane spacing of 0.34 nm or less], tin (elementary substance), tin compounds such as $SnO_x$ ($1 \leq x < 2$), silicon (elementary substance), silicon compounds such as $SiO_x$ ($1 \leq x < 2$), or lithium titanate compounds such as $Li_4Ti_5O_{12}$.

Among these, with respect to the capability of occluding and releasing lithium ions, it is more preferable to use a highly crystalline carbon material such as artificial graphite or natural graphite, and it is further preferable to use a carbon material having a graphite type crystal structure with a lattice spacing ($d_{002}$) of the lattice planes (002) of 0.340 nm (nanometer) or less, in particular, 0.335 to 0.337 nm.

When the negative electrode is pressure formed in such a way that the density of the negative electrode exclusive of the current collector is a density of 1.5 g/cm$^3$ or more, in the case where the ratio I(110)/I(004) between the peak intensity I(110) of the (110) plane of the graphite crystal and the peak intensity I(004) of the plane (004) of the graphite crystal obtained from the X-ray diffraction measurement of the negative electrode sheet is 0.01 or more, the electrochemical characteristics in a markedly wide temperature range is preferably improved; the ratio concerned is more preferably 0.05 or more and further preferably 0.1 or more. In addition, because an excessive processing sometimes degrades the crystallinity to decrease the discharge capacity of the battery, the upper limit of the peak intensity ratio I(110)/I(004) is preferably 0.5 or less and more preferably 0.3 or less.

In addition, when a highly crystalline carbon material (core material) is preferably coated with a carbon material lower in crystallinity than the core material, because the electrochemical characteristics in a wide temperature range is made markedly satisfactory. The crystallinity of the coating carbon material can be examined by TEM.

When a highly crystalline carbon material is used, such a highly crystalline carbon material reacts with the non-aqueous electrolytic solution during charging, and thus tends to degrade the electrochemical characteristics due to the increase of the interfacial resistance at a low temperature or a high temperature; however, in the lithium secondary battery according to the present invention, the electrochemical characteristics in a wide temperature range is satisfactory.

The negative electrode can be prepared as follows: a negative electrode mixture slurry is prepared by kneading with the same conducting agent, binder and high boiling point solvent as in the above-described preparation of the positive electrode, then the negative electrode mixture slurry is applied on the current collector such as a copper foil, dried and pressurized to form a negative electrode mixture layer.

The density of the negative electrode exclusive of the current collector is usually 1.1 g/cm$^3$ or more, and for the purpose of further enhancing the capacity of the battery, the density concerned is preferably 1.5 g/cm$^3$ or more and more preferably 1.7 g/cm$^3$ or more. It is to be noted that the upper limit of the density concerned is preferably 2 g/cm$^3$ or less.

In addition, as the negative electrode active material for a lithium primary battery, lithium metal or a lithium alloy may be suitably mentioned.

The structure of the lithium battery is not particularly limited; a coin type battery, a cylindrical battery, a rectangular type battery or a laminate battery having a mono layer separator or a multilayer separator can be applied.

The separator for a battery is not particularly limited; however, single layer or laminate microporous film, woven fabric, or nonwoven fabric of polyolefins such as polypropylene and polyethylene can be used for the separator.

The lithium secondary battery in the present invention is excellent in the electrochemical characteristics in a wide temperature range when the charge cut-off voltage is 4.2 V or higher, in particular, even 4.3 V or higher, and is excellent in the characteristics even when the charge cut-off voltage is 4.4 V or higher. The discharge cut-off voltage can be set usually at 2.8 V or higher, further at 2.5 V or higher; however, the lithium secondary battery in the present invention can set the discharge cut-off voltage at 2.0 V or higher. The current value is not particularly limited, but the lithium secondary battery is usually used in a current value range from 0.1 to 30 C. The lithium battery in the present invention can discharge at −40 to 100° C., and preferably at −20 to 80° C.

[Lithium Ion Capacitor]

The lithium ion capacitor of the present invention is an energy storage device for storing energy by utilizing the intercalation of lithium ions into a carbon material such as graphite serving as a negative electrode. The lithium ion capacitor of the present invention includes a positive electrode, a negative electrode, and a non-aqueous electrolytic solution according to the first aspect of the present invention including a lithium salt as dissolved in a non-aqueous solvent and a non-aqueous electrolytic solution according to the second aspect of the present invention including a lithium salt as dissolved in a non-aqueous solvent. It is referred to as a lithium ion capacitor (LIC). Examples of the positive electrode include: a lithium ion capacitor utilizing an electric double layer between an activated carbon electrode and an electrolytic solution, and a lithium ion capacitor utilizing the doping/dedoping reaction of a n-conjugated polymer electrode. In the electrolytic solution, at least a lithium salt such as $LiPF_6$ is included. In addition, as a negative electrode, the same negative electrode as the negative electrode of the aforementioned lithium secondary battery can be used.

EXAMPLES

Hereinafter, Examples of the non-aqueous electrolytic solution of the present invention are shown, but the present invention is not limited to these Examples.

Examples 1 to 14, and Comparative Examples 1 to 8

[Measurements of Physical Properties of Non-Aqueous Electrolytic Solution]

<Measurement of Flash Point>

The flash points of the non-aqueous electrolytic solutions listed in Table 1 and Table 2 were measured by using the Tag Closed Cup Flash Point Tester (model: ATG-7, manufactured by Tanaka Scientific Ltd.) on the basis of the standards of JIS K-2265.

<Measurement of Freezing Point>

The freezing points of the non-aqueous electrolytic solutions listed in Table 1 and Table 2 were measured by using an automatic freezing point meter (model: CP-2BX, manufactured by Electrochemistry Systems Co., Ltd.) on the basis of the standards of JIS K-0065.

<Measurement of Electric Conductivity>

The electric conductivities of the non-aqueous electrolytic solutions listed in Table 1 and Table 2 were measured by using an electric conductivity meter (model: CM-30R, manufactured by DKK-TOA Corporation) in an environment at 25° C.

The values of the physical properties are shown in Tables 1 and 2.

[Preparation of Lithium Ion Secondary Battery]

$LiNi_{0.5}Mn_{0.3}Co_{0.2}O_2$; 92% by mass, acetylene black (conducting agent); 5% by mass were mixed, the mixture was added to a solution preliminarily prepared by dissolving polyvinylidene fluoride (binder); 3% by mass in 1-methyl-2-pyrrolidone, and the resulting mixture was mixed to prepare a positive electrode mixture paste. The positive electrode mixture paste was applied on one surface of an aluminum foil (current collector), dried, subjected to a pressurization treatment, and then cut to a predetermined size to prepare a positive electrode sheet. The density of the positive electrode exclusive of the current collector was 3.6 g/cm³. In addition, silicon (elementary substance); 7% by mass, artificial graphite ($d_{002}$=0.335 nm, negative electrode active material); 85% by mass, acetylene black (conducting agent); 5% by mass were mixed, the mixture was added to a solution prepared by preliminarily dissolving polyvinylidene fluoride (binder); 5% by mass in 1-methyl-2-pyrrolidone, and the resulting mixture was mixed to prepare a negative electrode mixture paste. The negative electrode mixture paste was applied on one surface of a copper foil (current collector), dried, subjected to a pressurization treatment, and then cut to a predetermined size to prepare a negative electrode sheet. The density of the negative electrode exclusive of the current collector was 1.6 g/cm. In addition, an X-ray diffraction measurement was performed by using this electrode sheet, and consequently the ratio of the peak intensity I(110) of the (110) plane of the graphite crystal to the peak intensity I(004) of the (004) plane of the graphite crystal, [I(110)/I(004)] was 0.1. The positive electrode sheet, a microporous polyethylene film separator and the negative electrode sheet were laminated in the mentioned order, the non-aqueous electrolytic solution listed in Table 1 or Table 2 was added to the resulting laminate, and thus a laminate battery was prepared.

[Evaluation of Low Temperature Characteristics after High Temperature Charging and Storing]

<Initial Discharge Capacity>

By using the laminate battery prepared by the above-described method, in a thermostatic bath set at 25° C., at a constant current of 1 C and a constant voltage, charging was performed for 3 hours to the cut-off voltage of 4.4 V (the charging potential of the positive electrode was 4.5 V (vs. Li/Li⁺)), the temperature of the thermostatic bath was lowered to −20° C., discharging was performed with a constant current of 1 C to a cut-off voltage of 2.75 V, and thus, the initial discharge capacity at −20° C. was determined.

<High Temperature Charging and Storing Test>

Next, this laminate battery was charged for 3 hours to a cut-off voltage of 4.4 V in a thermostatic bath set at 85° C., at a constant current of 1 C and a constant voltage, and the laminate battery was stored for 2 days in the state of being maintained at 4.4 V. After storage for 2 days, immediately after the laminate battery was taken out from the thermostatic bath, a battery swelling was evaluated. Specifically, relative values were determined when the thickness variation before and after the storage of the laminate battery of Comparative Example 3 was taken to be 100. Subsequently, the laminate battery was placed in a thermostatic bath set at 25° C., once discharging was performed at a constant current of 1 C to a cut-off voltage of 2.75 V.

<Discharge Capacity after High Temperature Charging and Storing>

Thereafter, in the same manner as in the measurement of the initial discharge capacity, the discharge capacity at −20° C. after the high temperature charging and storing was determined.

<Low Temperature Characteristic after High Temperature Charging and Storing>

The low temperature characteristic after high temperature charging and storing was determined from the following retention rate of the discharge capacity at −20° C.

Discharge capacity retention rate (%) at −20° C.
  after high temperature charging and storing=
  (discharge capacity at −20° C. after high temperature charging and storing/initial discharge capacity at −20° C.)×100

The battery characteristics are shown in Tables 1 and 2.

It is to be noted that, in Tables 1 to 3, the following abbreviations are used: "EC" for ethylene carbonate, "PC" for propylene carbonate, "DMC" for dimethyl carbonate, "EP" for ethyl propionate, "MEC" for methyl ethyl carbonate, "TFEMC" for 2,2,2-trifluoroethyl methyl carbonate, "DFEA" for 2,2-difluoroethyl acetate, "TFEA" for 2,2,2-trifluoroethyl acetate, "DFEMC" for 2,2-difluoroethyl methyl carbonate, "VC" for vinylene carbonate, "FEC" for 4-fluoro-1,3-dioxolan-2-one, "TCDD" for tetrahydro-4H-cyclopenta[d][1,3,2]dioxathiol-2,2-dioxide, and "TOD complex" for bis(difluorophosphoryl)(2,5,8,11-tetraoxadodecane) dilithium.

was added in a solution preliminarily prepared by dissolving polyvinylidene fluoride (binder); 3% by mass in 1-methyl-2-pyrrolidone; the resulting mixture was mixed to prepare a positive electrode mixture paste. The positive electrode mixture paste was applied on one surface of an aluminum foil (current collector), dried, subjected to a pressurization treatment, and then cut to a predetermined size to prepare a positive electrode sheet. In addition, an artificial graphite ($d_{002}$=0.335 nm, negative electrode active material) was added in a content of 95% by mass in a solution preliminarily prepared by dissolving polyvinylidene fluoride (binder) in a content of 5% by mass in 1-methyl-2-pyrrolidone, and the resulting mixture was mixed to prepare a

TABLE 1

| | Composition of Li salt | Composition of non-aqueous electrolytic solution (volume proportions (vol %) of solvents) | | | | | | | Flash point (° C.) | Freezing point (° C.) | Electric conductivity (mS/cm) | Swelling magnitude in high temperature charging and storing test (%) | Low temperature characteristic after high temperature charging and storing (%) |
|---|---|---|---|---|---|---|---|---|---|---|---|---|---|
| | | EC | PC | MEG | DMC | TFEMC | TFEA | DFEA | | | | | |
| Example 1 | LiPF6 1.1M | 20 | 10 | 30 | 30 | 10 | — | — | ≥20 | <−50 | 9.2 | 90 | 73 |
| Example 2 | LiPF6 1.1M | 25 | 5 | 40 | 20 | 20 | — | — | ≥20 | <−50 | 8.7 | 88 | 75 |
| Example 3 | LiPF6 1.1M | 5 | 25 | 30 | 30 | 10 | — | — | ≥20 | <−50 | 8.6 | 85 | 71 |
| Example 4 | LiPF6 1.5M | 20 | 10 | 30 | 30 | 10 | — | — | ≥20 | <−50 | 8.1 | 92 | 71 |
| Example 5 | LiPF6 0.8M | 20 | 10 | 30 | 30 | 10 | — | — | ≥20 | <−50 | 8.7 | 87 | 70 |
| Example 6 | LiPF6 1.1M | 20 | 10 | 30 | 30 | — | 10 | — | ≥20 | <−50 | 9.6 | 96 | 64 |
| Example 7 | LiPF6 1.5M | 20 | 10 | 30 | 20 | — | 10 | — | ≥20 | <−50 | 8.7 | 97 | 63 |
| Example 8 | LiPF6 0.8M | 20 | 10 | 30 | 30 | — | 10 | — | ≥20 | <−50 | 9 | 95 | 61 |
| Example 9 | LiPF6 1.1M | 10 | 10 | 40 | 20 | — | — | 20 | ≥20 | <−50 | 8.6 | 92 | 73 |
| Example 10 | LiPF6 1.1M | 20 | 10 | 30 | 30 | — | — | 10 | ≥20 | <−50 | 9.8 | 93 | 71 |
| Example 11 | LiPF6 1.5M | 20 | 10 | 30 | 30 | — | — | 10 | ≥20 | <−50 | 8.6 | 95 | 69 |
| Comparative Example 1 | LiPF6 1.6M | 20 | 10 | 30 | 30 | 10 | — | — | ≥20 | <−50 | 7.8 | 107 | 59 |
| Comparative Example 2 | LiPF6 0.5M | 20 | 10 | 30 | 30 | 10 | — | — | ≥20 | −47 | 7.3 | 101 | 56 |
| Comparative Example 3 | LiPF6 1.1M | 10 | 10 | 50 | 20 | 10 | — | — | ≥20 | <−50 | 7.9 | 100 | 60 |
| Comparative Example 4 | LiPF6 1.1M | 10 | 10 | 20 | 40 | 20 | — | — | ≥20 | −43 | 8 | 120 | 54 |
| Comparative Example 5 | LiPF6 1.1M | 20 | 0 | 30 | 40 | 10 | — | — | ≥20 | −40 | 9.7 | 118 | 52 |
| Comparative Example 6 | LiPF6 1.1M | 0 | 15 | 30 | 40 | 15 | — | — | ≥20 | <−50 | 7.6 | 113 | 51 |
| Comparative Example 7 | LiPF6 1.1M | 20 | 10 | 30 | 10 | 30 | — | — | ≥20 | <50 | 7.6 | 101 | 60 |
| Comparative Example 8 | LiPF6 1.1M | 20 | 10 | 10 | 50 | 10 | — | — | ≥20 | −29 | 9.7 | 130 | 50 |

TABLE 2

| | Composition of Li salt | Composition of non-aqueous electrolytic solution (volume proportions (vol %) of solvents) | | | | | | | other additive (mass %) | Flash point (° C.) | Freezing point (° C.) | Electric conductivity (mS/cm) | Swelling magnitude in high temperature charging and storing test (%) | Low temperature characteristics after high temperature charging and storing (%) |
|---|---|---|---|---|---|---|---|---|---|---|---|---|---|---|
| | | EC | PC | VC | FEC | MEC | DMC | TFMEC | | | | | | |
| Example 12 | LiPF6 1M | 18 | 10 | 2 | — | 30 | 30 | 10 | TOD complex (2 mass %) | ≥20 | <−50 | 9.6 | 86 | 80 |
| Example 13 | LiPF6 0.7M + LiFSI 0.4M | 20 | 10 | — | — | 30 | 30 | 10 | TCDD (1 mass %) | ≥20 | <−50 | 10.3 | 80 | 81 |
| Example 14 | LiPF6 1M + LiDFOP 0.05M + LiPO2F2 0.05M | 15 | 10 | — | 5 | 30 | 30 | 10 | — | ≥20 | <−50 | 9.5 | 82 | 79 |

Examples 15 to 25 and Comparative Examples 9 to 16

[Preparation of Lithium Ion Capacitor]

An activated carbon powder having a specific surface area of 600 to 3000 m²/g; 92% by mass, and acetylene black (conducting agent); 5% by mass were mixed; the mixture negative electrode mixture paste. The negative electrode mixture paste was applied on one surface of a copper foil (current collector), dried, subjected to a pressurization treatment, and then cut to a predetermined size to prepare a negative electrode sheet. The density of the negative electrode exclusive of the current collector was 1.5 g/cm. In addition, an X-ray diffraction measurement was performed by using this electrode sheet, and consequently the ratio of the peak intensity I(110) of the (110) plane of the graphite crystal to the peak intensity I(004) of the (004) plane of the graphite crystal, [I(110)/I(004)] was 0.1. The positive electrode and the negative electrode obtained by the above-described processes were vacuum dried under heating, and lithium ions were electrochemically occluded into the negative electrode in such a way that the quantity of electricity per unit mass of the negative electrode active material was 372 mAh/g. The positive electrode sheet, a microporous polyethylene film separator and the negative electrode sheet were laminated in the mentioned order, the non-aqueous electrolytic solution listed in Table 3 was added to the resulting laminate, and thus a laminate battery was prepared.

[Evaluation of Low Temperature Characteristics after High Temperature Charging and Storing]

<Initial Discharge Capacity>

By using the laminate battery prepared by the above-described method, in a thermostatic bath set at 25° C., at a constant current of 1 C and a constant voltage, charging was performed for 3 hours to the cut-off voltage of 4.3 V (the charging potential of the positive electrode was 4.4 V (vs. Li/Li$^+$)), the temperature of the thermostatic bath was lowered to −20° C., discharging was performed with a constant current of 10 C to a cut-off voltage of 3 V, and thus, the initial cell capacity at −20° C. was determined.

<High Temperature Charging and Storing Test>

Next, this laminate battery was charged for 3 hours to a cut-off voltage of 4.3 V in a thermostatic bath set at 85° C., at a constant current of 1 C and a constant voltage, and the laminate battery was stored for 2 days in the state of being maintained at 4.3 V. After storage for 2 days, immediately after the laminate battery was taken out from the thermostatic bath, the occurrence or nonoccurrence of a battery swelling was evaluated. Specifically, relative values were determined when the thickness variation before and after the storage of the laminate battery of Comparative Example 11 was taken to be 100. Subsequently, the laminate battery was placed in a thermostatic bath set at 25° C., once discharging was performed at a constant current of 10 C to a cut-off voltage of 3 V.

<Discharge Capacity after High Temperature Charging and Storing>

Thereafter, in the same manner as in the measurement of the initial discharge capacity, the cell capacity at −20° C. after the high temperature charging and storing was determined.

<Low Temperature Characteristics after High Temperature Charging and Storing>

The low temperature characteristic after high temperature charging and storing was determined from the following retention rate of the cell capacity at −20° C.

Cell capacity retention rate (%) at −20° C. after high temperature charging and storing=(cell capacity at −20° C. after high temperature charging and storing/initial cell capacity at −20° C.)×100

The capacitor characteristics are shown in Table 3.

TABLE 3

| | Composition of Li salt | Composition of non-aqueous electrolytic solution (volume proportions (vol %) of solvents) | | | | | | | Flash point (° C.) | Freezing point (° C.) | Electric conductivity (mS/cm) | Swelling magnitude in high temperature charging and storing test (%) | Low temperature characteristic after high temperature charging and storing(%) |
|---|---|---|---|---|---|---|---|---|---|---|---|---|---|
| | | EC | PC | MEC | DMC | TFEMC | TFEA | DFEA | | | | | |
| Example 15 | LiPF6 1.1M | 20 | 10 | 30 | 30 | 10 | — | — | ≥20 | <−50 | 9.2 | 88 | 78 |
| Example 16 | LiPF6 1.1M | 25 | 5 | 40 | 20 | 20 | — | — | ≥20 | <−50 | 8.7 | 85 | 81 |
| Example 17 | LiPF6 1.1M | 5 | 25 | 30 | 30 | 10 | — | — | ≥20 | <−50 | 8.6 | 82 | 76 |
| Example 18 | LiPF6 1.5M | 20 | 10 | 30 | 30 | 10 | — | — | ≥20 | <−50 | 8.1 | 91 | 75 |
| Example 19 | LiPF6 0.8M | 20 | 10 | 30 | 30 | 10 | — | — | ≥20 | <−50 | 8.7 | 83 | 74 |
| Example 20 | LiPF6 1.1M | 20 | 10 | 30 | 30 | — | 10 | — | ≥20 | <−50 | 9.6 | 95 | 66 |
| Example 21 | LiPF6 1.5M | 20 | 10 | 30 | 30 | — | 10 | — | ≥20 | <−50 | 8.7 | 98 | 64 |
| Example 22 | LiPF6 0.8M | 20 | 10 | 30 | 30 | — | 10 | — | ≥20 | <−50 | 9 | 94 | 62 |
| Example 23 | LiPF6 1.1M | 10 | 10 | 40 | 20 | — | — | 20 | ≥20 | <−50 | 8.6 | 90 | 77 |
| Example 24 | LiPF6 1.1M | 20 | 10 | 30 | 30 | — | — | 10 | ≥20 | <−50 | 9.8 | 91 | 75 |
| Example 25 | LiPF6 1.5M | 20 | 10 | 30 | 30 | — | — | 10 | ≥20 | <−50 | 8.6 | 93 | 72 |
| Comparative Example 9 | LiPF6 1.6M | 20 | 10 | 30 | 30 | 10 | — | — | ≥20 | <−50 | 7.8 | 105 | 60 |
| Comparative Example 10 | LiPF6 0.5M | 20 | 10 | 30 | 30 | 10 | — | — | ≥20 | −47 | 7.3 | 101 | 59 |
| Comparative Example 11 | LiPF6 1.1M | 10 | 10 | 50 | 20 | 10 | — | — | ≥20 | <−50 | 7.9 | 100 | 60 |
| Comparative Example 12 | LiPF6 1.1M | 10 | 10 | 20 | 40 | 20 | — | — | ≥20 | −43 | 8 | 115 | 58 |
| Comparative Example 13 | LiPF6 1.1M | 20 | 0 | 30 | 40 | 10 | — | — | ≥20 | −40 | 9.7 | 114 | 56 |
| Comparative Example 14 | LiPF6 1.1M | 0 | 15 | 30 | 40 | 15 | — | — | ≥20 | <−50 | 7.6 | 110 | 55 |
| Comparative Example 15 | LiPF6 1.1M | 20 | 10 | 30 | 10 | 30 | — | — | ≥20 | <−50 | 7.6 | 100 | 61 |
| Comparative Example 16 | LiPF6 1.1M | 20 | 10 | 10 | 50 | 10 | — | — | ≥20 | −29 | 9.7 | 122 | 55 |

[Evaluations of Examples 1 to 14, Comparative Examples 1 to 8, Examples 15 to 25, and Comparative Examples 9 to 16]

Anyone of the lithium secondary batteries of foregoing Examples 1 to 14 is remarkably improved in the electrochemical characteristics in a wide temperature range, as compared with the lithium secondary batteries of Comparative Examples 1 to 8 using the non-aqueous electrolytic solutions including the non-aqueous solvents mixed with composition proportions different from the composition proportions in the non-aqueous solvents in the non-aqueous electrolytic solutions of the present invention. From the above-described results, it has been revealed that the effects of the present invention are the effects specific to the case where the non-aqueous electrolytic solutions of the present invention, having the specific compositions.

In addition, from a comparison of Examples 15 to 25 with Comparative Examples 9 to 16, it has also been revealed that the use of lithium capacitors results in the same effects.

Moreover, the non-aqueous electrolytic solution according to the first aspect of the present invention also has the effect to improve the discharge characteristics of the lithium primary battery in a wide temperature range.

Examples 26 to 33, and Comparative Examples 17 to 24

[Measurements of Physical Properties of Non-Aqueous Electrolytic Solution]

<Measurement of Flash Point>

The flash points of the non-aqueous electrolytic solutions listed in Table 4 and Table 5 were measured by using the Tag Closed Cup Flash Point Tester (model: ATG-7, manufactured by Tanaka Scientific Ltd.) on the basis of the standards of JIS K-2256.

<Measurement of Freezing Point>

The freezing points of the non-aqueous electrolytic solutions listed in Table 4 and Table 5 were measured by using an automatic freezing point meter (model: CP-2BX, manufactured by Electrochemistry Systems Co., Ltd.) on the basis of the JIS K-0065 Standards.

<Measurement of Electric Conductivity>

The electric conductivities of the non-aqueous electrolytic solutions listed in Table 4 and Table 5 were measured by using an electric conductivity meter (model: CM-30R, manufactured by DKK-TOA Corporation) in an environment at 25° C.

The values of the physical properties are shown in Tables 4 and 5.

[Preparation of Lithium Ion Secondary Battery]

$LiNi_{0.33}Mn_{0.33}Co_{0.34}O_2$; 93% by mass, and acetylene black (conducting agent); 4% by mass were mixed; the mixture was added in a solution preliminarily prepared by dissolving polyvinylidene fluoride (binder); 3% by mass in 1-methyl-2-pyrrolidone; the resulting mixture was mixed to prepare a positive electrode mixture paste. The positive electrode mixture paste was applied on one surface of an aluminum foil (current collector), dried, subjected to a pressurization treatment, and then cut to a predetermined size to prepare a positive electrode sheet. The density of the positive electrode exclusive of the current collector was 3.6 g/cm$^3$. In addition, silicon (elementary substance); 5% by mass and an artificial graphite ($d_{002}$=0.335 nm, negative electrode active material); 85% by mass and acetylene black (conducting agent); 5% by mass were mixed; the mixture was added in a solution preliminarily prepared by dissolving polyvinylidene fluoride (binder); 5% by mass in 1-methyl-2-pyrrolidone, and the resulting mixture was mixed to prepare a negative electrode mixture paste. The negative electrode mixture paste was applied on one surface of a copper foil (current collector), dried, subjected to a pressurization treatment, and then cut to a predetermined size to prepare a negative electrode sheet. The density of the negative electrode exclusive of the current collector was 1.6 g/cm$^3$. In addition, an X-ray diffraction measurement was performed by using this electrode sheet, and consequently the ratio of the peak intensity I(110) of the (110) plane of the graphite crystal to the peak intensity I(004) of the (004) plane of the graphite crystal, [I(110)/I(004)] was 0.1. The positive electrode sheet, a microporous polyethylene film separator and the negative electrode sheet were laminated in the mentioned order, the non-aqueous electrolytic solution listed in Table 4 or 5 was added to the resulting laminate, and thus a laminate battery was prepared.

[Evaluation of Low Temperature Characteristics after High Temperature Charging and Storing]

<Initial Discharge Capacity>

By using the laminate battery prepared by the above-described method, in a thermostatic bath set at 25° C., at a constant current of 1 C and a constant voltage, charging was performed for 3 hours to the cut-off voltage of 4.35 V, the temperature of the thermostatic bath was lowered to −20° C., discharging was performed with a constant current of 1 C to a cut-off voltage of 2.75 V, and thus, the initial discharge capacity at −20° C. was determined.

<High Temperature Charging and Storing Test>

Next, this laminate battery was charged for 3 hours to a cut-off voltage of 4.3 V in a thermostatic bath set at 60° C., at a constant current of 1 C and a constant voltage, and the laminate battery was stored for 14 days in the state of being maintained at 4.35 V. After storage for 14 days, immediately after the laminate battery was taken out from the thermostatic bath, the occurrence or nonoccurrence of a battery swelling was evaluated. Specifically, the case where the thickness of the laminate battery was 110% or more in relation to the thickness of the laminate battery before storage defined to be 100% was determined to involve the occurrence of swelling. Subsequently, the laminate battery was placed in a thermostatic bath set at 25° C., once discharging was performed at a constant current of 1 C to a cut-off voltage of 2.75 V.

<Discharge Capacity after High Temperature Charging and Storing>

Thereafter, in the same manner as in the measurement of the initial discharge capacity, the discharge capacity at −20° C. after the high temperature charging and storing was determined.

<Low Temperature Characteristics after High Temperature Charging and Storing>

The low temperature characteristic after high temperature charging and storing was determined from the following retention rate of the discharge capacity at −20° C.

Discharge capacity retention rate (%) at −20° C.
after high temperature charging and storing=
(discharge capacity at −20° C. after high temperature charging and storing/initial discharge capacity at −20° C.)×100

The battery characteristics are shown in Tables 4 and 5.

It is to be noted that, In Tables 4 to 6, the following abbreviations are used: "EC" for ethylene carbonate, "PC" for propylene carbonate, "DMC" for dimethyl carbonate, "EP" for ethyl propionate, "MEC" for methyl ethyl carbonate, "MP" for methyl propionate, "VC" for vinylene carbonate, "FEC" for 4-fluoro-1,3-dioxolan-2-one, "TCDD" for tetrahydro-4H-cyclopenta[d][1,3,2]dioxathiol-2,2-dioxide, and "TOD complex" for bis(difluorophosphoryl) (2,5,8,11-tetraoxadodecane) dilithium.

TABLE 4

| | Composition of Li salt | Composition of non-aqueous electrolytic solution (volume proportions (vol %) of solvents) | | | | | | Flash point (° C.) | Freezing point (° C.) | Electric conductivity (mS/cm) | 60° C. Charging storage characteristics Occurrence or nonoccurrence of swelling | −20° C. Discharge capacity retention rate (%) |
|---|---|---|---|---|---|---|---|---|---|---|---|---|
| | | EC | PC | DMC | EP | MEC | MP | | | | | |
| Example 26 | LiPF6 1.1M | 20 | 10 | 30 | 10 | 30 | — | ≥20 | −49 | 10.2 | Not occurred | 75 |
| Example 27 | LiPF6 1.1M | 20 | 10 | 20 | 20 | 30 | — | ≥20 | <−50 | 10.1 | Not occurred | 77 |
| Example 28 | LiPF6 1.1M | 5 | 25 | 20 | 20 | 30 | — | ≥20 | <−50 | 9.8 | Not occurred | 73 |
| Example 29 | LiPF6 1.1M | 20 | 10 | 20 | 10 | 40 | — | ≥20 | <−50 | 9.8 | Not occurred | 73 |
| Example 30 | LiPF6 1.5M | 20 | 10 | 30 | 10 | 30 | — | ≥20 | <−50 | 9.4 | Not occurred | 74 |
| Comparative Example 17 | LiPF6 0.8M | 20 | 10 | 30 | 10 | 30 | — | ≥20 | <−50 | 9.7 | Not occurred | 58 |
| Comparative Example 18 | LiPF6 1.6M | 20 | 10 | 30 | 10 | 30 | — | ≥20 | <−50 | 9.1 | Not occurred | 63 |
| Comparative Example 19 | LiPF6 1.1M | 30 | — | 20 | 20 | 30 | — | <20 | −41 | 10.4 | Not occurred | 65 |
| Comparative Example 20 | LiPF6 1.1M | — | 15 | 30 | 10 | 45 | — | <20 | <−50 | 8.5 | Not occurred | 60 |
| Comparative Example 21 | LiPF6 1.1M | 20 | 10 | 10 | 10 | 50 | — | ≥20 | <−50 | 9.3 | Not occurred | 66 |
| Comparative Example 22 | LiPF6 1.1M | 20 | 10 | 40 | 10 | 20 | — | <20 | −37 | 10.6 | Occurred | 60 |
| Comparative Example 23 | LiPF6 1.1M | 20 | 10 | 30 | — | 30 | 10 | <20 | <−50 | 10.5 | Occurred | 58 |
| Comparative Example 24 | LiPF6 1.1M | 20 | 10 | 20 | 5 | 30 | 15 | <20 | <−50 | 10.7 | Occurred | 64 |

TABLE 5

| | Composition of Li salt | Composition of non-aqueous electrolytic solution (volume proportions (vol %) of solvents) | | | | | | | Other additive (mass %) | Flash point (° C.) | Freezing point (° C.) | Electric conductivity (mS/cm) | 60° C. Charging storage characteristics Occurrence or nonoccurrence of swelling | −20° C. Discharge capacity retention rate (%) |
|---|---|---|---|---|---|---|---|---|---|---|---|---|---|---|
| | | EC | PC | VC | FEC | DMC | EP | EMC | | | | | | |
| Example 31 | LiPF6 1M | 18 | 10 | 2 | — | 20 | 20 | 30 | TOD complex (2 mass %) | ≥20 | <−50 | 9.6 | Not occurred | 84 |
| Example 32 | LiPF6 0.7M + LiFSI 0.4M | 20 | 10 | — | — | 20 | 20 | 30 | TCDD (1 mass %) | ≥20 | <−50 | 10.3 | Not occurred | 82 |
| Example 33 | LiPF6 1M + LiDFOP 0.05M + LiPO2F2 0.05M | 15 | 10 | — | 5 | 20 | 20 | 30 | — | ≥20 | <−50 | 9.5 | Not occurred | 81 |

Examples 34 to 37 and Comparative Examples 25 to 32

[Preparation of Lithium Ion Capacitor]

An activated carbon powder having a specific surface area of 600 to 3000 m²/g; 92% by mass, and acetylene black (conducting agent); 5% by mass were mixed; the mixture was added in a solution preliminarily prepared by dissolving polyvinylidene fluoride (binder); 3% by mass in 1-methyl-2-pyrrolidone; the resulting mixture was mixed to prepare a positive electrode mixture paste. The positive electrode mixture paste was applied on one surface of an aluminum foil (current collector), dried, subjected to a pressurization treatment, and then punched out to a predetermined size to prepare a positive electrode sheet. In addition, an artificial graphite ($d_{002}$=0.335 nm, negative electrode active material) was added in a content of 95% by mass in a solution preliminarily prepared by dissolving polyvinylidene fluoride (binder) in a content of 5% by mass in 1-methyl-2-pyrrolidone, and the resulting mixture was mixed to prepare a negative electrode mixture paste. The negative electrode mixture paste was applied on one surface of a copper foil (current collector), dried, subjected to a pressurization treatment, and then cut to a predetermined size to prepare a negative electrode sheet. The density of the negative electrode exclusive of the current collector was 1.5 g/cm. In addition, an X-ray diffraction measurement was performed by using this electrode sheet, and consequently the ratio of the peak intensity I(110) of the (110) plane of the graphite crystal to the peak intensity I(004) of the (004) plane of the graphite crystal, [I(110)/I(004)] was 0.1. The positive electrode and the negative electrode obtained by the above-described processes were vacuum dried under heating, and lithium ions were electrochemically occluded into the negative electrode in such a way that the quantity of electricity per unit mass of the negative electrode active material was 372 mAh/g. The positive electrode sheet, a microporous polyethylene film separator and the negative electrode sheet were laminated in the mentioned order, the non-aqueous electrolytic solution listed in Table 6 was added to the resulting laminate, and thus a laminate battery was prepared.

[Evaluation of Low Temperature Characteristics after High Temperature Charging and Storing]

<Initial Discharge Capacity>

By using the laminate battery prepared by the above-described method, in a thermostatic bath set at 25° C., at a constant current of 1 C and a constant voltage, charging was performed for 3 hours to the cut-off voltage of 4.2 V, the temperature of the thermostatic bath was lowered to −20° C., discharging was performed with a constant current of 10 C to a cut-off voltage of 3 V, and thus, the initial cell capacity at −20° C. was determined.

<High Temperature Charging and Storing Test>

Next, this laminate battery was charged for 3 hours to a cut-off voltage of 4.3 V in a thermostatic bath set at 60° C., at a constant current of 1 C and a constant voltage, and the laminate battery was stored for 7 days in the state of being maintained at 4.3 V. After storage for 14 days, immediately after the laminate battery was taken out from the thermostatic bath, the occurrence or nonoccurrence of a battery swelling was evaluated. Specifically, the case where the thickness of the laminate battery was 110% or more in relation to the thickness of the laminate battery before storage defined to be 100% was determined to involve the occurrence of swelling. Subsequently, the laminate battery was placed in a thermostatic bath set at 25° C., once discharging was performed at a constant current of 10 C to a cut-off voltage of 3 V.

<Discharge Capacity after High Temperature Charging and Storing>

Thereafter, in the same manner as in the measurement of the initial discharge capacity, the cell capacity at −20° C. after the high temperature charging and storing was determined.

<Low Temperature Characteristics after High Temperature Charging and Storing>

The low temperature characteristic after high temperature charging and storing was determined from the following retention rate of the cell capacity at −20° C.

Cell capacity retention rate (%) at −20° C. after high temperature charging and storing=(cell capacity at −20° C. after high temperature charging and storing/initial cell capacity at −20° C.)×100

The capacitor characteristics are shown in Table 6.

tive Examples 17 to 24 using the non-aqueous electrolytic solutions including the non-aqueous solvents mixed with composition proportions different from the composition proportions in the non-aqueous solvents in the non-aqueous electrolytic solutions of the present invention. From the above-described results, it has been revealed that the effects of the present invention are the effects specific to the case where the non-aqueous electrolytic solutions of the present invention, having the specific compositions.

In addition, from a comparison of Examples 34 to 37 with Comparative Examples 25 to 32, it has also been revealed that the use of lithium capacitors results in the same effects.

Moreover, the non-aqueous electrolytic solution according to the second aspect of the present invention also has the effect to improve the discharge characteristics of the lithium primary battery in a wide temperature range.

INDUSTRIAL APPLICABILITY

When the non-aqueous electrolytic solution according the first aspect of the present invention and the non-aqueous electrolytic solution according to the second aspect of the present invention are used, it is possible to obtain a lithium secondary battery or a lithium ion capacitor, capable of being used at a high potential, and excellent in the electrochemical characteristics in a wide temperature range. In particular, when these non-aqueous electrolytic solutions are used as the non-aqueous electrolytic solutions for the energy storage devices such as the lithium secondary batteries mounted on hybrid electric vehicles, plug-in hybrid electric vehicles, and battery electric vehicles, it is possible to obtain lithium secondary batteries or lithium ion capacitors hardly degraded in electrochemical characteristics in a wide temperature range.

TABLE 6

| | Composition of Li salt | Composition of non-aqueous electrolytic solution (volume proportions (vol %) of solvents) | | | | | | Flash point (° C.) | Freezing point (° C.) | Electric conductivity (mS/cm) | 60° C. Charging storage characteristics | |
|---|---|---|---|---|---|---|---|---|---|---|---|---|
| | | EC | PC | DMC | EP | MEC | MP | | | | Occurrence or nonoccurrence of swelling | −20° C. Discharge capacity retention rate (%) |
| Example 34 | LiPF6 1.1M | 20 | 10 | 30 | 10 | 30 | — | ≥20 | −49 | 10.2 | Not occurred | 82 |
| Example 35 | LiPF6 1.1M | 20 | 10 | 20 | 20 | 30 | — | ≥20 | <−50 | 10.1 | Not occurred | 84 |
| Example 36 | LiPF6 1.1M | 5 | 25 | 20 | 20 | 30 | — | ≥20 | <−50 | 9.8 | Not occurred | 80 |
| Example 37 | LiPF6 1.5M | 20 | 10 | 30 | 10 | 30 | — | ≥20 | <−50 | 9.4 | Not occurred | 81 |
| Comparative Example 25 | LiPF6 0.8M | 20 | 10 | 30 | 10 | 30 | — | ≥20 | <−50 | 9.7 | Not occurred | 65 |
| Comparative Example 26 | LiPF6 1.6M | 20 | 10 | 30 | 10 | 30 | — | ≥20 | <−50 | 9.1 | Not occurred | 72 |
| Comparative Example 27 | LiPF6 1.1M | 30 | — | 20 | 20 | 30 | — | <20 | −41 | 10.4 | Not occurred | 73 |
| Comparative Example 28 | LiPF6 1.1M | — | 15 | 30 | 10 | 45 | — | <20 | <−50 | 8.5 | Not occurred | 67 |
| Comparative Example 29 | LiPF6 1.1M | 20 | 10 | 10 | 10 | 50 | — | ≥20 | <−50 | 9.3 | Not occurred | 75 |
| Comparative Example 30 | LiPF6 1.1M | 20 | 10 | 40 | 10 | 20 | — | <20 | −37 | 10.6 | Occurred | 67 |
| Comparative Example 31 | LiPF6 1.1M | 20 | 10 | 30 | — | 30 | 10 | <20 | <−50 | 10.5 | Occurred | 66 |
| Comparative Example 32 | LiPF6 1.1M | 20 | 10 | 20 | 5 | 30 | 15 | <20 | <−50 | 10.7 | Occurred | 71 |

Evaluations of Examples 26 to 33 and Comparative Examples 17 to 24, and Examples 34 to 37 and Comparative Examples 25 to 32

Any one of the lithium secondary batteries of foregoing Examples 26 to 33 is remarkably improved in the electrochemical characteristics in a wide temperature range, as compared with the lithium secondary batteries of Compara-

The invention claimed is:

1. A non-aqueous electrolytic solution, comprising:
   a non-aqueous solvent; and
   a lithium salt dissolved in the non-aqueous solvent in a concentration of from 1.1 to 1.5 M (mol/L),
   wherein the non-aqueous solvent comprises, based on a total of the non-aqueous solvent, 5 to 20% by volume of ethylene carbonate, 5 to 25% by volume of propylene carbonate, 20 to 30% by volume of dimethyl carbonate, 30 to 40% by volume of methyl ethyl carbonate, and 10 to 20% by volume of ethyl propionate, wherein a total amount of ethylene carbonate and propylene carbonate in the non-aqueous solvent is from 20 to 30% by volume, and a total amount of dimethyl carbonate and ethyl propionate in the non-aqueous solvent is from 30 to 40% by volume, and wherein a flash point of the non-aqueous electrolytic solution is 20° C. or higher.

2. The non-aqueous electrolytic solution of claim 1, further comprising vinylene carbonate in an amount of 0.1 to 5% by volume based on the total of the non-aqueous solvent.

3. The non-aqueous electrolytic solution of claim 1, further comprising fluoroethylene carbonate in an amount of 1 to 10% by volume based on the total of the non-aqueous solvent.

4. The non-aqueous electrolytic solution of claim 1, wherein the lithium salt comprises at least one selected from the group consisting of $LiPF_6$, $(FSO_2)_2NLi$, $LiPO_2F_2$, lithium methyl sulfate, lithium ethyl sulfate, $FSO_3Li$, lithium difluoro(oxalato)borate, lithium tetrafluoro(oxalato)phosphate, lithium difluorobis(oxalato)phosphate, and lithium bis(oxalato)borate.

5. A lithium secondary battery, comprising:
a positive electrode;
a negative electrode; and
the non-aqueous electrolytic solution of claim 1.

6. The lithium secondary battery of claim 5, wherein the positive electrode comprises, as a positive electrode active material, at least one selected from the group consisting of a lithium composite metal oxide and a lithium-containing olivine-type phosphate.

7. The lithium secondary battery of claim 5, wherein the negative electrode comprises, as a negative electrode active material, at least one selected from the group consisting of lithium metal, a lithium alloy, a carbon material capable of occluding and releasing lithium, tin (elementary substance), a tin compound, silicon (elementary substance), a silicon compound, and a lithium titanate compound.

* * * * *